United States Patent [19]

Bens

[11] 4,204,886

[45] May 27, 1980

[54] METHOD FOR IMPROVING AND ARTICLE HAVING IMPROVED WEAR RESISTANCE

[75] Inventor: Frederick P. Bens, Grosse Point City, Mich.

[73] Assignee: Kolene Corp., Detroit, Mich.

[21] Appl. No.: 32,736

[22] Filed: Apr. 24, 1979

[51] Int. Cl.$^2$ ................................................ C23C 9/16
[52] U.S. Cl. .................................. 148/15.5; 148/31.5; 308/241; 428/469
[58] Field of Search ..................... 148/31.5, 15.5, 16.6; 308/240, 241, DIG. 8, DIG. 9; 428/469

[56] References Cited

U.S. PATENT DOCUMENTS

| | | | |
|---|---|---|---|
| 2,361,211 | 10/1944 | Kalischer et al. | 427/135 |
| 2,622,993 | 12/1952 | McCullough et al. | 427/5 |
| 3,022,204 | 2/1962 | Müller et al. | 148/15.5 |
| 3,208,885 | 9/1965 | Müller | 148/15.5 |
| 4,019,928 | 4/1977 | Beyer et al. | 148/15.5 |

*Primary Examiner*—L. Dewayne Rutledge
*Assistant Examiner*—John P. Sheehan
*Attorney, Agent, or Firm*—William N. Hogg

[57] ABSTRACT

A method of improving resistance of ferrous parts to wear failure such as galling and seizure, and parts having such increased resistance are disclosed. The invention includes a two step process wherein the part is first nitrided to provide a nitride case. A coating of molybdenum-disulfide ($MoS_2$) is then applied over the nitrided case.

4 Claims, No Drawings

METHOD FOR IMPROVING AND ARTICLE HAVING IMPROVED WEAR RESISTANCE

BACKGROUND OF THE INVENTION

This invention relates generally to ferrous metal articles having improved resistance to wear, such as galling and seizure in friction applications, particularly journaled applications e.g. stearing columns, and a method of producing such improved resistance to galling and wear seizure. There are many applications where it is desireable to improve resistance to galling and seizure for low speed journal applications. As mentioned above, one of these is on automatic steering columns, and others will be readily apparent.

In these journal type applications, the constant metal to metal rubbing causes a galling and seizure problem resulting in excessive wear and premature failure. It has long been desired to provide a solution to this problem in the form of parts having increased wear resistance.

SUMMARY OF THE INVENTION

It has been found that the resistance of a steel part to galling, seizure and other wear characteristics can be greatly increased by a two step process. First, a nitride case is formed on the ferrous part and thereafter a molybdenumdisulfide coating is applied thereon. This greatly increases the wear resistance of the part, such increase being greater than either step being done individually.

DESCRIPTION OF THE PREFERRED EMBODIMENTS

According to the present invention the resistance of ferrous metal parts to wear, such as galling and seizure is greatly reduced by a two step process or operation. The process has been used successfully on steering arm extensions for automobiles in a journaled type function environment, but the process is equally applicable for other similar journal friction environments.

The process is basically a two step process for treating the ferrous metal parts involved. The first step is that of providing a nitride case on the article. This can be supplied by any conventional nitriding process, for example gas nitriding or salt bath nitriding. The preferred methods are salt bath nitriding such as, for example, Tufftriding or Melonizing. Tufftriding is a cyanide/cyanate bath, as described in U.S. Pat. Nos. 3,208,885 and 3,022,204, and Melonizing is an essentially cyanate process as described in U.S. Pat. No. 4,019,928.

After the nitride case has been attained, the second step in the process is to apply a molybdenum-disulfide coating over the nitride case. This is applied as a dry film in any conventional manner, such as by rolling in dry powder, spraying, brushing, or by dipping the part into a suspension of the $MoS_2$ in oil, or by impregnating a cloth with the $MoS_2$ and rubbing it onto the part.

In a test on steering column extensions, the shafts treated with the Melonite plus molybdenum-disulfide passed 4,000,000 test cycles in a test environment used by a commerical supplier of such shafts.

Controlled Falex tests were performed comparing untreated shafts with those having nitride cases only and molybdenum-disulfide only without nitrided case, and parts treated according to this invention.

The Falex test is performed on a Falex lubricant testing machine manufactured by Faville-LeVally Corporation of Chicago, Illinois. The machine utilizes test pins, which in this case were SAE 3135 alloy steel. Incorporated in the machine are hardened SAE 1137 alloy steel jaws which bear against the pins being treated. The pins are rotated in contact with the jaws, and upon each rotation of the pins, the pressure of the jaws against the test pin is increased. The time and the torque in lbs. is measured until the pins fail by seizure, or galling. The longer the time and the higher the load the better resistance to wear failure the pins have.

Table I below shows a comparison of various SAE 3135 steel pins treated in different manners and tested on the Falex test machine. As noted above, the higher the load and the longer the time, the more resistant to failure the pins are.

TABLE I

| Sample No. | Condition | Failure Load | Time |
|---|---|---|---|
| 1 | Untreated | 500 lbs. | 13 seconds |
| 2 | Untreated | 400 lbs. | 9 seconds |
| 3 | Nitrided only | 1600 lbs. | 62 seconds |
| 4 | Nitrided plus $MoS_2$ | 3650 lbs. | 3 Min.–7 Sec. |
| 5 | Nitrided plus $MoS_2$ | 3750 lbs. | 3 Min.–21 Sec. |

The nitriding was done according to U.S. Pat. No. 3,208,885 in a cyanide/cyanate bath of about 45–50% KCN, 45–50% KCNO at a temperature of about 1060° F., and the $MoS_2$ was rubbed on from a rag impregnated with $MoS_2$.

As can be seen, the material which was nitrided and then had an $MoS_2$ coating was significantly better than untreated pins, and pins that had just a nitride case.

Table II below compares various samples in which a different nitriding process was used, and these tests were performed at a different time from those in Table I without an attempt to exactly duplicate test conditions.

TABLE II

| Sample No. | Condition | Failure Load Lbs. | Time |
|---|---|---|---|
| 6 | Untreated | 1000 | 40 Sec. |
| 7 | Nitrided only | 1250 | 45 Sec. |
| 8 | Nitrided only | 1150 | 42 Sec. |
| 9 | Nitrided only | 1250 | 48 Sec. |
| 10 | Nitrided only | 1250 | 45 Sec. |
| 11 | Nitrided only | 1250 | 49 Sec. |
| 12 | Nitrided only | 1150 | 48 Sec. |
| 13 | Polished plus $MoS_2$ only | 2100 | 1 Min.–41 Sec. |
| 14 | $MoS_2$ only | 1900 | 1 Min.–30 Sec. |
| 15 | $MoS_2$ only | 2100 | 1 Min.–38 Sec. |
| 16 | Nitrided plus $MoS_2$ | 3100 | 2 Min.–39 Sec. |
| 17 | Nitrided plus $MoS_2$ | 2850 | 2 Min.–39 Sec. |
| 18 | Nitrided plus $MoS_2$ | 2250 | 1 Min.–49 Sec. |

In this case, the nitriding was the Melonite process according to U.S. Pat. No. 4,019,928, in which there was about 34–36% KCNO, about 1% CN, with the bath at a temperature of about 1075° F. Also, the bath used for Samples 17 and 18 was somewhat sludged, so optimum nitride case was not obtained. The $MoS_2$ was rubbed on from a rag impregnated with $MoS_2$.

As can be seen from Table II, a nitrided case plus an $MoS_2$ coating is significantly better than untreated pins, pins only nitrided, and pins only coated with $MoS_2$. The closest to the two step treatment is the $MoS_2$ alone, but even in this case each sample in the two step process of this invention was better than any sample with an MoS$_2$ coating alone. Also, the average load for Samples 16, 17 and 18 is 2733 lbs. and the average times of these samples is 2 minutes 22 seconds. This compares to the average load for Samples 13, 14, and 15 of 2033 lbs. and an average time for these Samples of 1 minute 36 seconds. Hence, it can be seen that the two step process of this invention is a significant improvement over either nitriding or an MoS$_2$ coating alone.

The reason for such improvement is not completely understood. However, it is believed that a significant factor may be that the nitriding provides a hard, but micro-porous case, with the voids in the case receiving the MoS$_2$ lubricant. In such a situation, a hard, but lubricated outer surface is presented for wear.

In any event, the two step process of nitriding, followed by an MoS$_2$ coating provides a surface with outstanding wear characteristics.

What is claimed is:

1. A method of improving the resistance of ferrous metal parts to galling and seizure in friction environments which process comprises,
    first providing a nitride case on said metal part,
    thereafter applying a coating of molybdenum-disulfide over said nitride case.
2. The method of claim 1 wherein said nitride coating is provided in a cyanide/cyanate bath.
3. The invention as defined in claim 1 wherein the nitride case is provided in an essentially cyanate bath.
4. A ferrous metal part having increased resistance to galling and seizure in friction application comprising, a nitride case on said part, and a coating of molybdenum-disulfide over said nitride case.

* * * * *